Feb. 6, 1934.　　　　　R. PATRICK　　　　　1,946,106

CONNECTER

Filed Dec. 10, 1932

INVENTOR.
RUSSELL PATRICK
BY
ATTORNEYS.

Patented Feb. 6, 1934

1,946,106

UNITED STATES PATENT OFFICE 1,946,106

CONNECTER

Russell Patrick, Indianapolis, Ind., assignor to United States Tire Company, Incorporated, Indianapolis, Ind., a corporation of Indiana Application December 10, 1932
Serial No. 646,604

2 Claims. (Cl. 285—170)

My invention relates to a connecting device which consists generally of means forming a passageway for fluid pressure, means for retaining the threaded end of a connecting member, and means actuated by said fluid pressure to form a seal between said first named means and said connecting member.

By way of example, I have shown the present connecter particularly applicable for use with valve stems of inner tubes during the curing of such tubes. For such use it is important that the connecter be quickly applied and retained to the valve stem, while at the same time the seal between the members be dependable and positive. If, in this use, a leak should occur between the valve stem and the connecter the blast of air so escaping is frequently directed toward the tube mold, with the result that it has a tendency to cool the affected area of the mold, thereby destroying the uniformity of the vulcanizing temperature.

A further disadvantage is that such a leak results in a reduced pressure within the tube, which is also a departure from vulcanization uniformity.

Conventional types of connecters for this purpose generally incorporate a fixed sealing gasket mounted in such a position that the valve stem end will butt against it to effectuate a seal. Such sealing means has been found ineffective in that it is not a dependable seal.

Objects and advantages of my invention are to form a positive and quick acting connection with the valve stem, and a positive and dependable means for effectuating a seal between the connecter and the valve stem.

Figure 1:
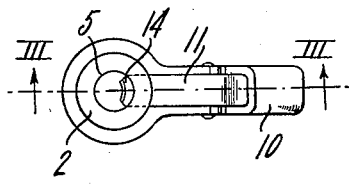
Figure 2:
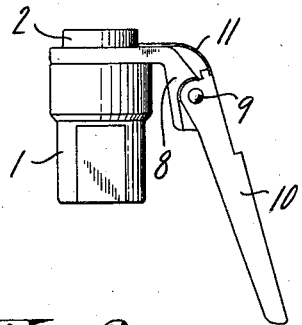
Figure 3:
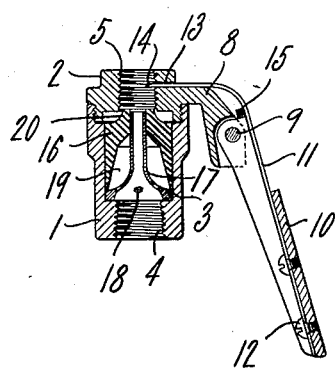
Figure 4:
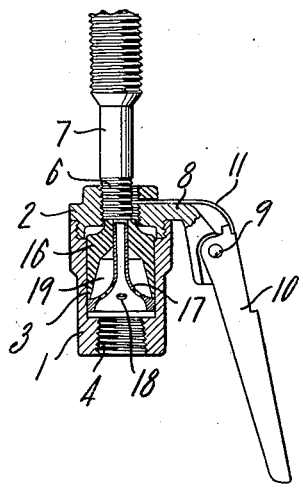

My invention is illustrated in the accompanying drawing, in which:

Fig. 1 is a plan view of the connecter;
Fig. 2 is a side elevational view thereof;
Fig. 3 is a side elevational view, in section, taken along lines III—III of Fig. 1; and
Fig. 4 is a side elevational view, partly in section, illustrating the connecter in operable position.

Referring now to the drawing, the device consists principally of a barrel 1 and a cap 2. The barrel 1 has a recessed aperture 3 and a threaded aperture 4. The aperture 4, joining with aperture 3, forms means for attaching a conduit such as a hose or pipe line (not shown) leading to a source of fluid pressure supply.

The opposite or cap end of the connecter is provided with a threaded aperture 5 for engagement with threads 6 at the end of a valve stem 7.

The threads of aperture 5 have the same pitch as the threads 6 of the valve stem, but such threads 5 have a larger diameter to allow for an easy insertion of the threads 6 into the opening formed by the threaded aperture 5. It should be understood that the threads 6 of the valve stem are moved axially into the aperture 5 and are not threaded together, as by a turning movement.

A lug 8 projecting from the cap 2 supports a pivot 9 on which is hinged a lever 10. A flat spring 11 is fastened to the lever 10 by cap screws 12. This spring is so positioned that it extends through a slot 13 in the cap 2 and terminates within the threaded aperture 5. The extended end 14 of the spring 11 is curved radially and beveled to engage and mesh with the threads 6 of the valve stem. The spring 11 normally urges the end inwardly of the threaded aperture 5. Movement of the lever 10, assisted by a spring support 15, provides means for moving the end portion 14 of the spring transversely away from the threaded aperture 5.

Within the recessed aperture 3 of the barrel 1 are two elements which effectuate the proper seal. A gasket 16, cylindrical in outer shape and of cone cored inner outline, is axially slidable within the recessed aperture 3. This gasket is preferably composed of rubber. Upper part 20 of this gasket is narrow so that it will pass a short distance into the threaded aperture 5. This part 20 forms in effect the actual sealing element which contacts in butt engagement with the end of the valve stem 7.

A perforated sleeve or nozzle 17, of flexible material such as rubber, provides means for moving the gasket 16 when the nozzle is subjected to fluid pressure. This nozzle 17 is tube-like in structure, and is flared out at its lower end so that it reacts as a piston within the recessed aperture 3. The gasket 16 fits snugly around the upper tubular part of the nozzle 17 so that axial movement of the nozzle carries with it the gasket 16. A plurality of small apertures 18 are disposed about the flared portion of the nozzle so as to form communicating passageways to a chamber 19 formed by the outer surface of the nozzle and the inner surface of the gasket.

In operation, the valve stem 7 is generally retained in a fixed position, as by a mold wall. The connecter forms the terminal of any conventional type of flexible line leading to a source of fluid pressure. The operator grasps the connecter, at the same time pressing the lever 10 inwardly to clear the end 14 of the spring 11 from within the threaded aperture 5, but not withdrawing it from the cap 2. Holding the connecter in this way, the operator engages it with the valve stem 7 so that the threaded portion 6 enters the threaded aperture 5.

The lever 10 is then released, and the spring end 14 engages with the threads 6 of the valve stem, forcing same over to one side so that the opposite portion of the threads 6 become interlocked with the corresponding threads of the aperture 5. The spring 11 has sufficient tension to maintain the relation of the valve stem and the connecter in this substantially locked position. As the valve stem and connecter are engaged, the upper part 20 of the gasket 16 forms a stop limiting the movement of the connecter toward the valve stem during its application. As the corresponding threaded portions 5 and 6 become interlocked there may be a slight axial movement between the valve stem and the connecter due to the beveled edges of the threads seeking their proper alignment.

The end of the valve stem striking the upper portion 20 of the gasket 16, which acts as a stop therefor, causes a downward movement of both the gasket 16 and the nozzle 17.

When the operator opens a control valve (not shown) for introducing fluid pressure through the valve stem, the onrushing fluid pressure strikes the narrowing portion of the nozzle and, due to its velocity, forces the nozzle 17 together with the gasket 16 to operate as a piston and to force the upper part 20 of the gasket 16 into tight contact engagement with the end of the valve stem 7. As soon as the fluid pressure builds up within the nozzle 17, it passes through the apertures 18 into the chamber 19. This action causes the long, circular, tapered edges of the gasket 16 to expand with pressure against the surface of the apertured recess 3, thereby effectively preventing the escape of fluid pressure along the surface of the recess. Furthermore, this internal expanding pressure holds the gasket 16 in a substantially rigid relationship with the barrel 1 of the connecter during the period in which such fluid pressure is retained within the connecter.

When it is desired to remove the connecter from the valve stem, this may be easily and quickly accomplished by closing the control valve (not shown), grasping the connecter, and actuating lever 10 which releases the spring from engagement with the threaded end of the valve stem and permits its ready withdrawal. The release of pressure also permits the nozzle 17 and gasket 16 to return to their inactive positions.

It is to be understood that the form of my invention herewith shown and described is to be taken as a preferred example of the same, and that various changes in the shape, size, and arrangement of parts may be resorted to without departing from the spirit of my invention, or the scope of the following claims.

Having thus described my invention, what I claim and desire to protect by Letters Patent is:

1. A connecter comprising a recessed body portion having an opening for a discharge conduit and an opening for a supply conduit, a gasket movably mounted in and engaging the surface of said recess and having a portion adapted to project into the discharge opening, the interior of said gasket being of conoidal shape, and a perforated nozzle disposed in said recess beneath the gasket in communication with the supply opening and having a portion extending through the gasket and into communication with the discharge opening, whereby upon the application of fluid pressure to the nozzle it moves toward the discharge opening carrying with it the gasket, and the fluid passing through the perforations in the nozzle causes the gasket to expand against the surface of the recess.

2. A connecter comprising a recessed body portion having a discharge opening at one end and a supply opening at the other end, a cup shaped gasket movably mounted in and engaging the surface of said recess with its open end facing the supply opening, and a funnel shaped nozzle having a perforated wall disposed in said recess and having a passageway communicating from the supply opening to the discharge opening through the gasket, a portion of said nozzle being in engagement with the recess wall at the open end of the gasket, whereby upon the application of fluid under pressure to the nozzle it moves toward the discharge opening carrying with it the gasket, and fluid traversing a perforation in the nozzle enters the chamber formed between the inner surface of the gasket and the outer surface of the nozzle to expand the gasket to form a tight fit with the recess wall.

RUSSELL PATRICK.